Patented Apr. 19, 1927.

1,625,133

UNITED STATES PATENT OFFICE.

THOMAS B. MOHLER, OF BURLINGAME, CALIFORNIA.

FUEL AND PROCESS OF MAKING SAME.

No Drawing.  Application filed August 23, 1922. Serial No. 583,906.

The present invention relates to the production of a cheap fuel from waste materials and resides in the provision of a process by means of which waste material from tanneries and organic matter, such as old newspapers, waste paper, sawdust, dried garbage and other waste organic matter, also coal dust, peat, coke, charcoal or the like are combined to provide a highly efficient cheap fuel preferably in the form of cakes or briquettes, which fuel will provide a normally inflammable gas which may be readily rendered non-inflammable.

As the principal waste ingredient, I prefer to use spent tan liquor which at present is daily thrown away in large quantities at tanneries, although, I may obtain tan liquor from spent tan bark and scrap leather and will hereinafter describe the uses of the last two waste products.

To provide a fuel of my invention I may use spent tan liquor as discharged or thrown away at the tannery and saturate organic matter with said liquor. The organic matter I preferably use comprises waste material such as old papers, rags, dried garbage, etc., although I may use coal dust, peat, or charcoal and in the latter cases will increase the burning propensities and fuel qualities of such materials.

As an example, to old paper or paper in either finely divided form or in chunks or lumps or pieces, but dry, I add sufficient spent tan liquor to saturate the paper. After saturation the paper is dried by furnace heat or otherwise, as desired, or before drying, I may press the paper into lumps, blocks or briquettes and then dry the lumps, etc. In either event the paper after drying is ready for use as fuel.

Best results are obtained however, by concentrating the spent tan liquor before saturation of the organic matter. I concentrate the liquor by evaporation with any suitable apparatus, and for example, to the concentrated liquor I add substantially 25% by volume, each, of bicarbonate of soda and vinegar. The resultant liquor is then used to saturate the particular organic matter selected to form a part of the fuel and the same process as to drying after saturation, or briquetting, then drying, is carried out. The concentrated liquor will produce a fuel of longer burning qualities and otherwise improve the fuel.

Instead of using spent tan liquor I may obtain a liquor of a similar nature from spent tan bark.

As an example, to 1 pound of spent tan bark, I add 2 quarts of water, 4 ozs. of bicarbonate of soda, and 4 ozs. vinegar and then boil the mixture from fifteen to twenty-five minutes so as to extract the liquor from the spent bark and provide a concentrated liquor similar to the liquor previously referred to. With the liquor thus obtained I treat the selected organic matter as previously described to provide a fuel.

By adding to the tan bark mixture 4 ozs. of leather shavings or better, scrap leather obtained after tanning operations, there is added to the liquor resulting from the extraction and concentration step, a substance or ingredient derived from the leather scrap which causes said liquor to act as an effective binder as well as a combustible. The tan liquor in the scrap leather will strengthen the liquor extracted from the bark, as regards the combustible quality of the liquor. Thus, a liquor so obtained from the waste products is highly desirable where finely divided particles of organic matter, such as coal dust or sawdust are used as ingredients of the fuel, inasmuch as the binder qualities of the liquor facilities the production of blocks, chunks or briquettes of the fuel so produced. Furthermore, the liquor thus obtained is suitable for use as a universal binder for pulverulent material.

To provide gas from the waste material it is only necessary to burn the fuel produced under the process of my invention in the ordinary gas furnace or retort. The gas produced is suitable for uses of the ordinary coal or oil gas and compares favorably with the latter, and is found to be exceptionally light. It may be rendered non-inflammable by special treatment and owing to its being exceptionally lighter than air will be highly desirable for balloons, dirigibles and like air craft.

I have found that the raw spent tan or concentrated liquor of the invention are of little value as a combustible when used independently of organic matter such as described, said liquor apparently requiring combination with organic matter in order to provide an improved fuel.

The residue left after burning of the fuel of my invention includes in its composition pure carbon in the approximate proportion of one-fifth of the amount of fuel burned. This by-product is non-inflammable and can be used for various purposes for which carbon is now used, and is particularly desirable as an ingredient in the manufacture of plastic building material, such as building blocks, wall board, fire brick, and also in fire-proof paint. By thus utilizing the residue after burning, I eliminate practically all waste in materials used in the production of my fuel.

Besides the carbon, in the burning of the fuel of my invention, there are obtained other by-products such as coal tar, ammonia, etc.

To make one ton of fuel of this invention, using coal dust and garbage as an organic matter, together with tan liquor, either waste or spent tan liquor, or tan liquor obtained from spent tan bark, both as described hereinbefore, I mix with 1802 pounds of preferably moisture free coal dust, 50 pounds of tannery or tan liquor, the mixing being effected to such an extent as to insure the dampening of all of the coal particles. To this mixture I then add 900 pounds of wet city garbage, preferably having a moisture content of 80%, thereby producing a solid content of 180 pounds. I then grind this mixture in a suitable mill to insure complete maceration and mixing of the coal dust, garbage and tan liquor. The resultant mixture is then dried by any suitable means until it reaches a briquetting consistency, for example, having a moisture content of 20%. This semi-dry mixture is then pressed into briquettes and the briquettes allowed to dry, after which they are ready for use as fuel.

I claim:

1. A fuel comprising spent tan liquor and organic matter in which the spent tan liquor and organic matter are pre-treated separately before and collectively after admixture.

2. A fuel comprising spent tan liquor and organic matter in which the spent tan liquor is pre-treated to obtain concentration before admixture of organic matter.

3. A fuel comprising organic matter which has been saturated with spent tan liquor and dried after saturation, the spent tan liquor having been treated to concentrate it prior to its admixture with the organic matter.

4. The process of making a fuel which consists in saturating organic matter other than tan bark with spent tan liquor which has been treated prior to its saturation to concentrate it and then drying the saturated organic matter.

5. The process of making a fuel which consists in saturating organic matter with spent tan liquor, pressing the saturated organic matter into briquette form and then drying the saturated organic matter.

6. The process of making a fuel which consists in concentrating spent tan liquor, saturating organic matter with the concentrated spent tan liquor and then drying the saturated organic matter.

7. The process of making a fuel which consists in adding to tan liquor scrap leather obtained after tanning operations, boiling the tan liquor with the scrap leather therein to extract liquors from the leather scrap, saturating organic matter with the resulting liquor and then drying the organic matter.

8. A fuel comprising tan liquor and extracted liquors from leather scrap obtained after tanning operations and organic matter which has been saturated with the liquors and then dried.

THOMAS B. MOHLER.